United States Patent [19]

Momose

[11] Patent Number: 5,068,675

[45] Date of Patent: Nov. 26, 1991

[54] FACSIMILE APPARATUS HAVING HEAT FIXATION DEVICE

[75] Inventor: Masanori Momose, Yokohama, Japan

[73] Assignee: Canon Kabushiki Kaisha, Tokyo, Japan

[21] Appl. No.: 449,758

[22] Filed: Dec. 13, 1989

[30] Foreign Application Priority Data

Dec. 15, 1988 [JP] Japan .................................. 63-317244
Dec. 21, 1988 [JP] Japan .................................. 63-324507

[51] Int. Cl.$^5$ .......................................... G01D 15/10
[52] U.S. Cl. ............................... 346/76 PH; 355/284; 355/285
[58] Field of Search ................ 358/296, 300; 355/284, 355/285, 289; 346/76 PH

[56] References Cited

U.S. PATENT DOCUMENTS

| 4,717,967 | 1/1988 | Yoshida | 358/296 |
| 4,737,860 | 4/1988 | Ono et al. | 358/298 |
| 4,998,121 | 3/1991 | Koh et al. | 346/160 |

FOREIGN PATENT DOCUMENTS 0295901 12/1988 European Pat. Off. ............. 355/284
22078064 2/1988 Japan .

*Primary Examiner*—Benjamin R. Fuller
*Assistant Examiner*—Nancy Le
*Attorney, Agent, or Firm*—Fitzpatrick, Cella, Harper & Scinto

[57] ABSTRACT

There is disclosed a facsimile apparatus capable of economizing the power required for the heater for heat fixation of the recorded image. Instead of continuous heating, the heater is activated in response to a particular signal in the received message and is deactivated after the recording of a page, or plural pages in case of a continuous receiving operation.

15 Claims, 11 Drawing Sheets

| FIG.4A | FIG.4B |

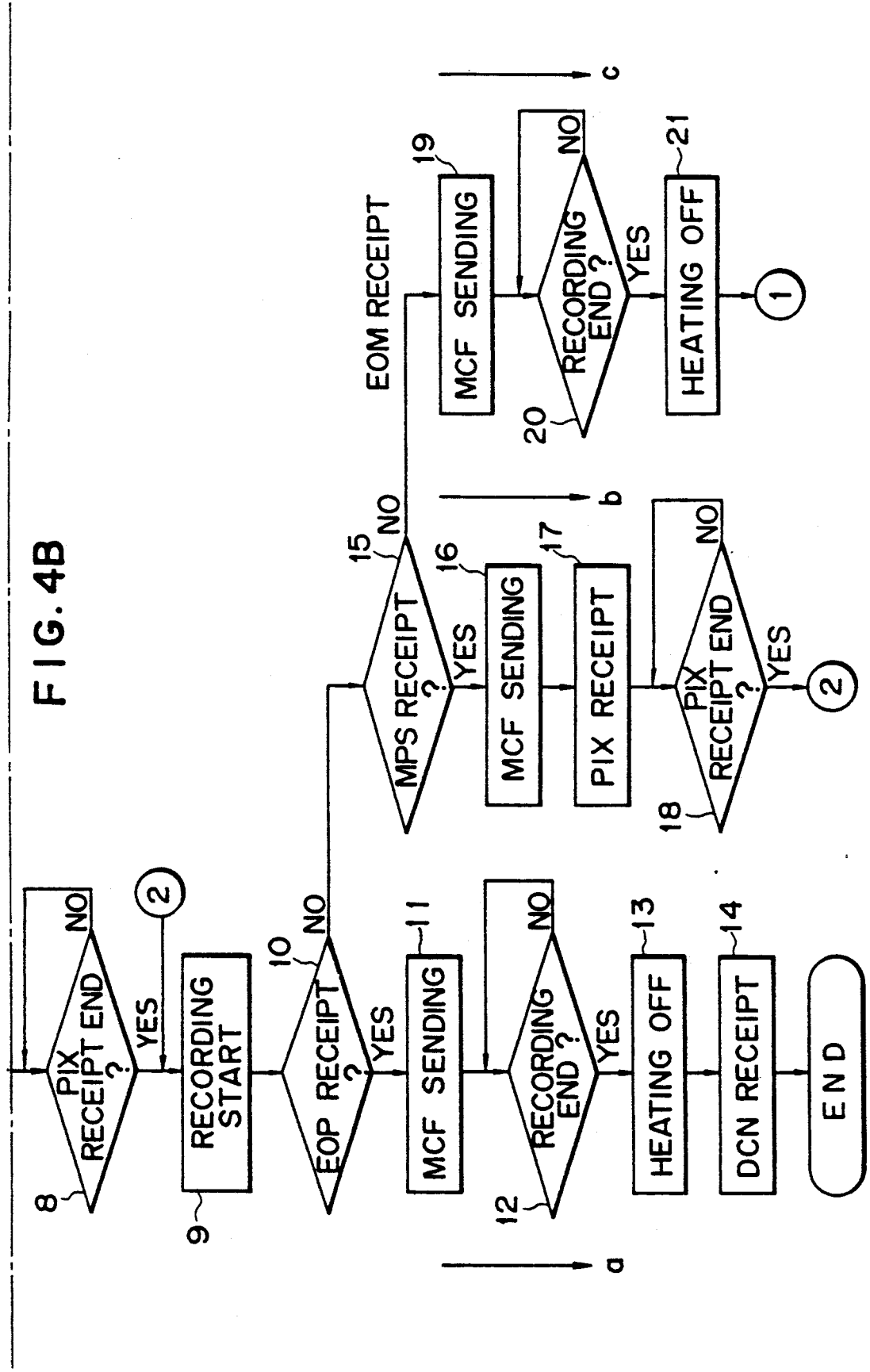

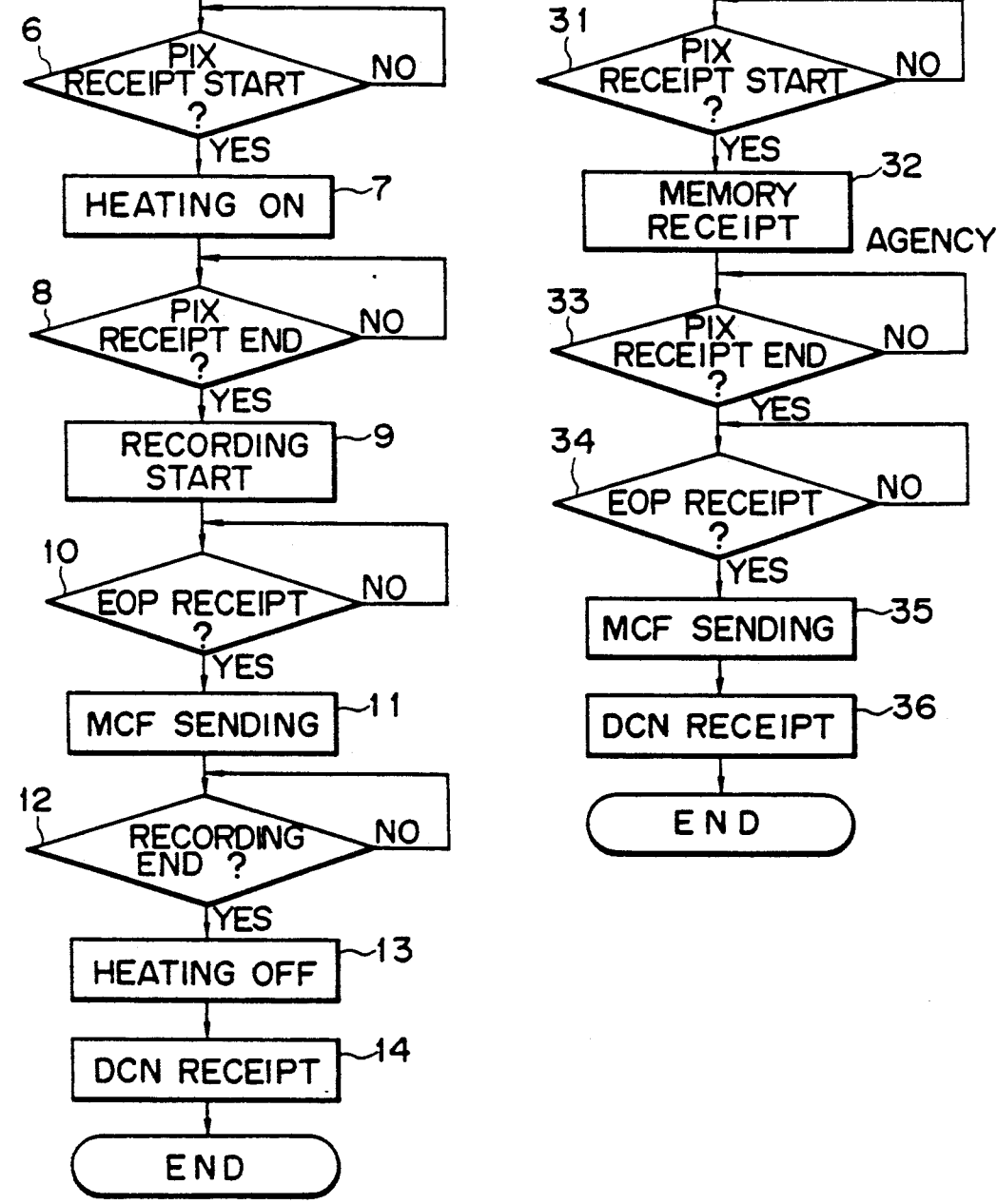

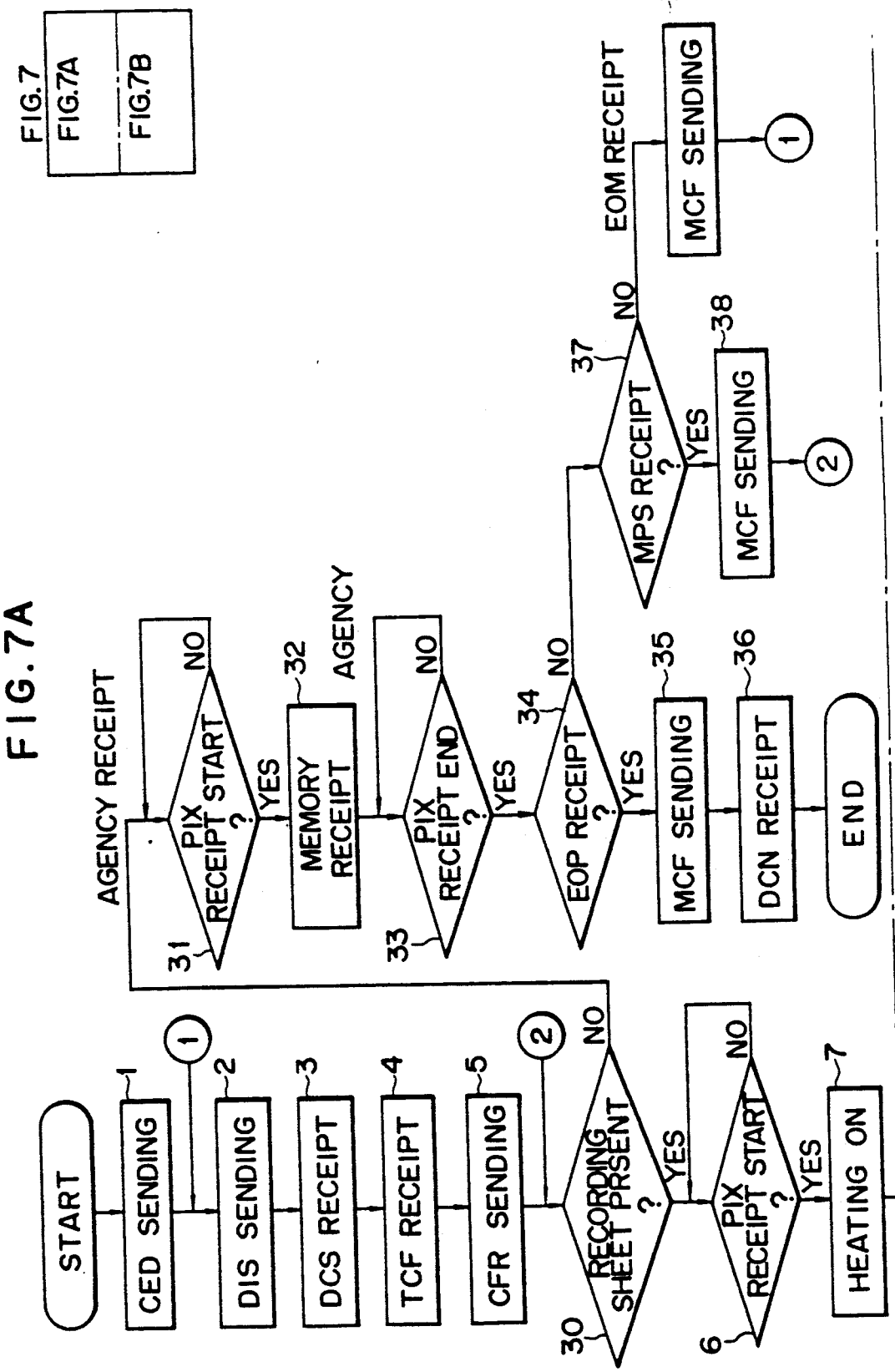

FACSIMILE APPARATUS HAVING HEAT FIXATION DEVICE

BACKGROUND OF THE INVENTION

1. Field of the Invention

The present invention relates to a recording apparatus for forming a visible image on a recording material according to received signals and fixing said visible image by heat.

2. Related Background Art

In conventional recording apparatus, such as facsimile apparatus, utilizing thermal image fixation, such as a laser beam printer utilizing plain paper for recording, the image fixing heater has to be always turned on because the temperature elevation thereof is slow. Thus the heater is so designed as to be continuously turned on to maintain a constant temperature regardless whether the facsimile apparatus is in the stand-by, receiving or transmitting state.

Such continuous energization of the fixing heater leads to following drawbacks:

(1) A high electric power consumption, giving rise to a high running cost;

(2) The operation becomes very uneconomical in the facsimile apparatus if the percentage of transmission is high, because the fixing heater is turned on during the stand-by state and transmission state, though the recording is required only in the reception and copying mode; and (3) cooling for example with a fan is indispensable for avoiding temperature increase in the apparatus, and the dimension of the apparatus is inevitably increased for this reason.

SUMMARY OF THE INVENTION

In consideration of the foregoing, an object of the present invention is to provide an improved recording apparatus.

Another object of the present invention is to provide a recording apparatus capable of reducing the electric power consumption.

Still another object of the present invention is to provide a recording apparatus capable of preventing temperature increase therein.

Still another object of the present invention is to provide a recording apparatus forming an image by an electrophotographic process, capable of energizing image fixing means in response to a received signal.

Still another object of the present invention is to provide a recording apparatus capable of energizing image fixing means at every predetermined communication unit.

Still another object of the present invention is to provide a recording apparatus capable of heating control for image fixing means according to the communication mode.

Still another object of the present invention is to provide a recording apparatus in which the power supply to image fixing means is turned off in the substituted reception mode.

The foregoing and still other objects of the present invention, and the advantages thereof, will become fully apparent from the following description to be taken in conjunction with the attached drawings.

DETAILED DESCRIPTION OF THE PREFERRED EMBODIMENTS

Figure 1:
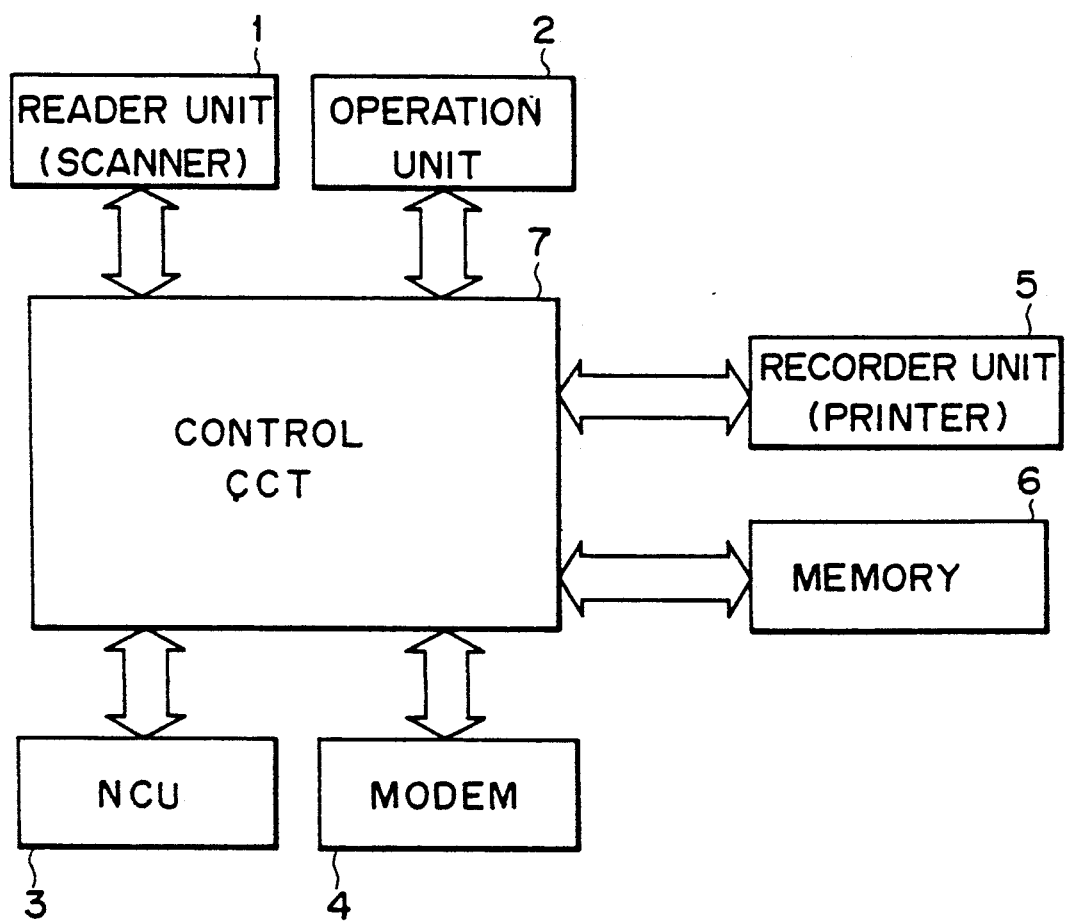
FIG. 1 is a block diagram of a facsimile apparatus constituting an embodiment of the present invention.

FIG. 1 is a schematic block diagram of a facsimile apparatus constituting an embodiment of the present invention, wherein provided are a reader unit 1 for reading an original document at the transmission; an operation unit 2 for setting the transmitting or receiving operation; a network control unit (NCU) 3 for effecting transmission to or reception from a communication channel; a modem 4 for demodulating analog signals from the NCU into digital signals or modulating digital signals into analog signals for transmission to the NCU; a memory 6 for storing data demodulated by the modem 4 and processed by a control circuit 7; and a recorder unit 5 for printing the data received from the memory 6 through the control circuit 7.

Figure 2:
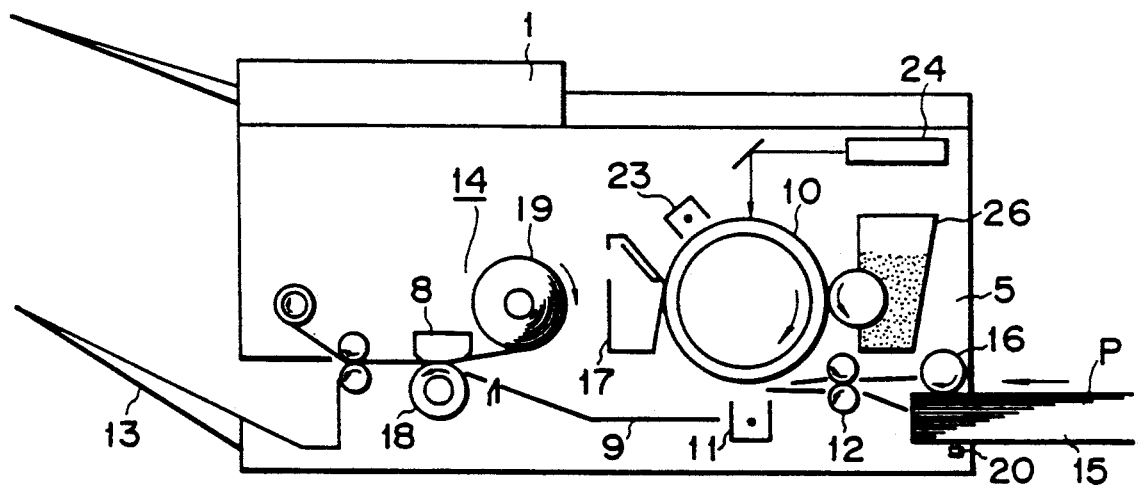
FIG. 2 is a cross-sectional view of the facsimile apparatus.

FIG. 2 is a schematic cross-sectional view of a facsimile apparatus embodying the present invention. A charger 23 uniformly charges a photosensitive drum 10 covered with a photosensitive layer composed for example of zinc oxide or an organic semiconductor. The photosensitive drum 10 uniformly charged with said charger 23 is imagewise exposed to a laser beam emitted from an optical system unit including a semiconductor laser, a polygon mirror etc. to form an electrostatic latent image, which is then rendered visible, in a developing unit 26, with toner particles composed for example of heat-fusible resin. On the other hand, a sheet P is advanced from a cassette 15, by a sheet feed roller 16, to the position of registration rollers 12. Then the sheet P is forwarded to an image transfer position by the registration rollers 12 positioned in mutual contact in vertical direction and driven in synchronization with the image formed on the photosensitive drum 10. Thus the toner image on the photosensitive drum 10 is transferred onto the sheet P by means of a transfer charger 11. Then the sheet P separated from the photosensitive drum 10 by already known separating means is transported along a transport guide 9 to a fixing unit 14, and is charged onto a tray 13 after image fixation by heating. After the transfer of the toner image, the toner remaining on the photosensitive drum 10 is removed by a cleaner 17. A sensor 20 is provided for detecting the presence of sheet in the cassette 15.

The fixing unit 14 includes a heating member 8 generating heat by electric power supply, a pressure roller 18 and a heat resistant sheet (fixing film) 19. The heating member 8 is a linear member of a low heat capacity fixed to the apparatus, and is composed for example of an alumina substrate of 1.0 mm in thickness, 6 mm in width and 240 mm in length, coated with a resistance material of a width of 1.5 mm, which is given electric current supply from both ends. The electric power supply is conducted for example with pulses of DC 100 V with repeating cycle of 20 msec., and the pulse duration is varied in a range from 0.5 to 5 msec. according to the desired temperature and energy emission controlled by an unrepresented temperature detector.

The fixing film 19 is moved, in a direction indicated by an arrow, in contact with the heating member 8 controlled in temperature and energy emission as explained above. Said fixing film is for example composed of a heat resistant film, such as polyimide, polyetherimide, PES or PFA of a thickness of 20 $\mu$, coated, at least on a face contacting the image, with a releasing layer of a thickness of 10 $\mu$ composed of a fluorinated resin such as PTFE or PAF and a conductive material. In general, the total thickness is less than 100 $\mu$, preferably 40 $\mu$. The pressure roller 18 provided with a releasing rubber layer, composed for example of silicone rubber, presses the heating member 8 across the fixing film with a total pressure of 4-7 kg. The sheet with unfixed toner image is guided along the guide 9 to the fixing unit, and the fixed image is obtained by the heating.

The fixing film explained above may also be formed as an endless film.

Figure 3A:
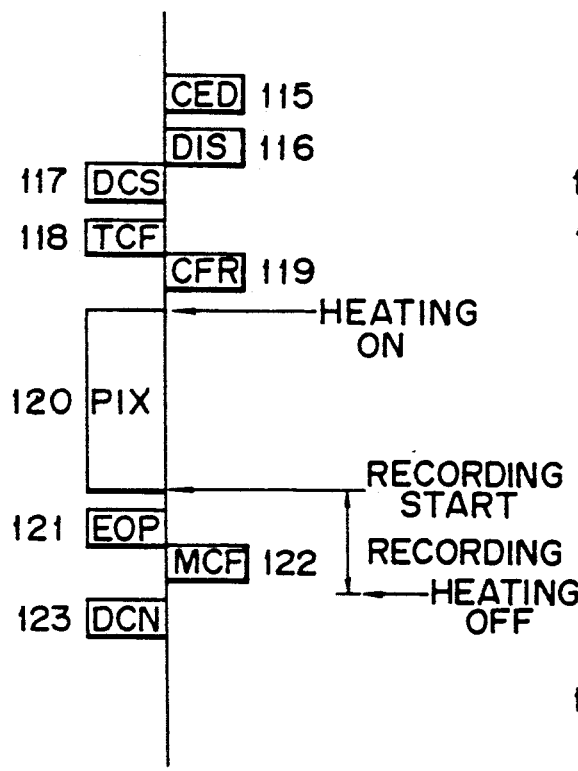
FIGS. 3A to 3C are timing charts showing the timing of heating of a heat generating member.
Figure 3B:
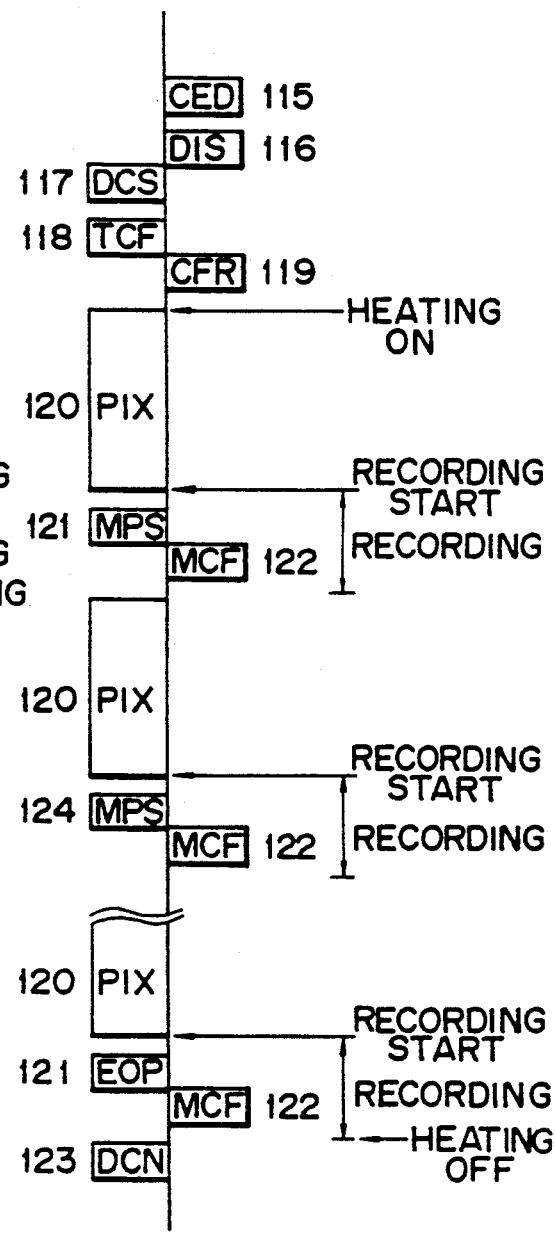
Figure 3C:
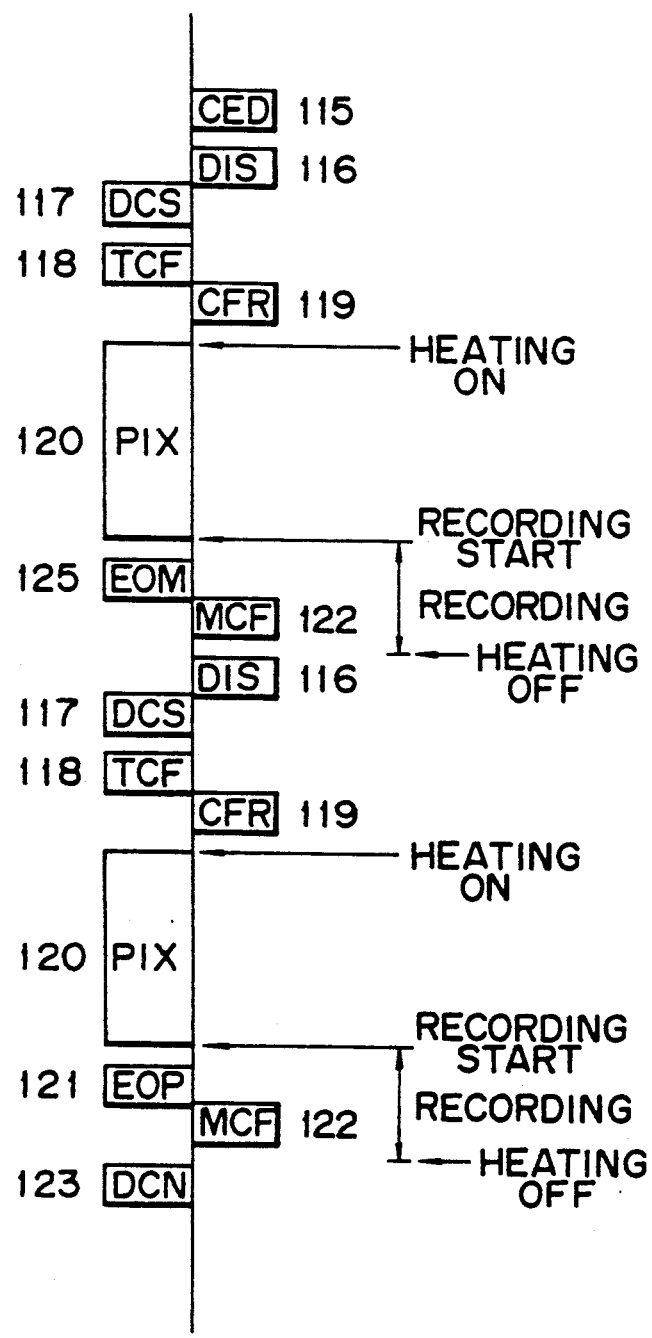

FIGS. 3A to 3C are timing charts showing the function of the facsimile apparatus at the reception. The codes and functions of the signals are summarized in Tab. 1.

TAB. 1

| No. | Code | Function |
|---|---|---|
| 115 | CED | Caller identification, for auto facsimile reception; |
| 116 | DIS | Initial identification, for transmitting facsimile functions to the other station; |
| 117 | DCS | Reception command, for selecting reception mode according to the function of the other station; |
| 118 | TCF | Training check, for checking transmission error prior to image transmission; |
| 119 | CFR | Reception ready confirmation, for informing the read state for reception; |
| 120 | PIX | Image signal; |
| 121 | EOP | End of procedure, indicating end of transmission of a page without succeeding pages; |
| 122 | MCF | Message confirmation, indicating proper reception of image; |
| 123 | DCN | Disconnect, for disconnecting the channel; |
| 124 | MPS | Multi-page signal, indicating end of transmission of a page, with a succeeding page; |
| 125 | EOM | End of message, indicating end of transmission of a page with a succeeding page. |

FIG. 3A is a timing chart, indicating the timing of heating of the heating member 8 in case of single page reception. The heating operation of the heating member 8 is started at the start of reception of the PIX (image) signal 120 by the receiving unit, after the transmission of the CFR signal 119. Because of a small heat capacity, the heating member 8 can be heated to the fixing temperature within several seconds. This is sufficiently in time for the start of image recording after the reception, since the transmission of an image usually takes several ten seconds to several minutes. After the completion of recording, the heating is terminated in response to the EOP signal 121 indicating the reception of on page only.

FIG. 3B shows the timing of heating of the heating member 8 in case of multiple-page reception. The heating is started in the same manner as in the single page reception, but the heating operation of the heating member 8 is continued even after the recording of a page if the MPS (multi-page signal) 121 has been received. The same procedure is continued if the MPS signal 121 is received in succession. Finally the heating of the heating member 8 is turned off and the reception is terminated when the EOP 121 is received after the PIX signal 120.

FIG. 3C shows the timing of heating in case of a mode change in the transmitted images in the multipage reception. If the EOM signal 125 is received after the recording of a 1 st page, the heating of the heating member 8 is turned off once, because the protocol signal for the next page takes time.

Subsequently the heating operation of the heating member 8 is started again at the start of reception of image signal of the next page, after the protocol (DIS, DCS - CFR). The procedure is same as explained above if the EOM signal 125 is received. Finally, in response to the EOP signal 121, the heating operation of the heating member 8 is turned off and the reception is terminated.

Figure 4:
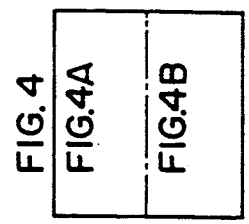
FIG. 4, consisting of FIGS. 4A and 4B, is a flow chart of control sequence for the heat generating member.
Figure 4A:
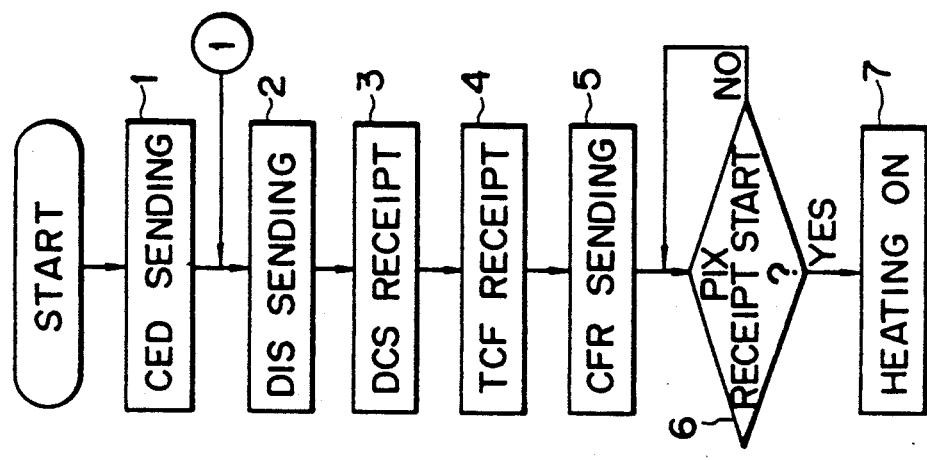

FIG. 4 is a flow chart for the above-explained control.

In response to a received call signal, the CED signal is transmitted (step 1), and then the DIS signal is transmitted to inform the facsimile function to the calling apparatus (step 2). Then the DCS signal for designating the reception mode is received from the calling apparatus (step 3), and the TCF signal for checking transmission error is received (step 4). If there is no transmission error, the CFR signal is transmitted to the calling apparatus to inform that the apparatus is ready for reception (step 5). Then the sequence waits until the start of reception of the image signal PIX (step 6). At the start of reception, the image signal is stored in the memory 6, and the power supply to the heating member 8 is started (step 7). When the reception of the image signal PIX is completed (step 8), there is started the recording operation based on the received image signal (step 9). The image data are read from the memory 6 and are used for turning the laser beam on and off, thereby forming, on the photosensitive drum 10, an electrostatic latent image which is developed with toner in the developing unit 26. Also the sheet is fed from the cassette 15 to the position of the registration rollers, and is advanced to the image transfer position in synchronization with the image on the photosensitive drum 10. After the transfer of the toner image onto the sheet, it is transported to the fixing unit 14 for image fixation by heating. Then there is discriminated whether EOP signal, indicating the end of procedure, has been received (step 10), and, if received, the message confirmation signal MCF, indicating the proper reception of the image, is transmitted to the other apparatus (step 11). Then the sequence awaits the completion of the recording operation (step 12), and the power supply to the heating member 8 is turned off (step 13). Subsequently the procedure is terminated by receiving the DCN signal for disconnecting the channel.

If the EOP signal is not received in the step 10, there is discriminated whether the multi-page signal MPS, indicating the end of transmission of a page and the presence of a next page, has been received (step 15). If it is received, the message confirmation signal MCF is sent to the other apparatus (step 16). Then the image signal PIX of the next page is received and stored in the memory 6. After the completion of reception (steps 17, 18), and the sequence returns to the step 9.

On the other hand, if the multi-page signal MPS is not received in the step 15, the message confirmation signal MCF is sent to the other apparatus (step 19). Then, when the recording is completed (step 20), the power supply to the heating member 8 is turned off (step 21) and the sequence returns to the step 2.

In case of FIG. 3A, 3B or 3C, the sequence respectively proceeds to a flow a, b or c.

Figure 5:
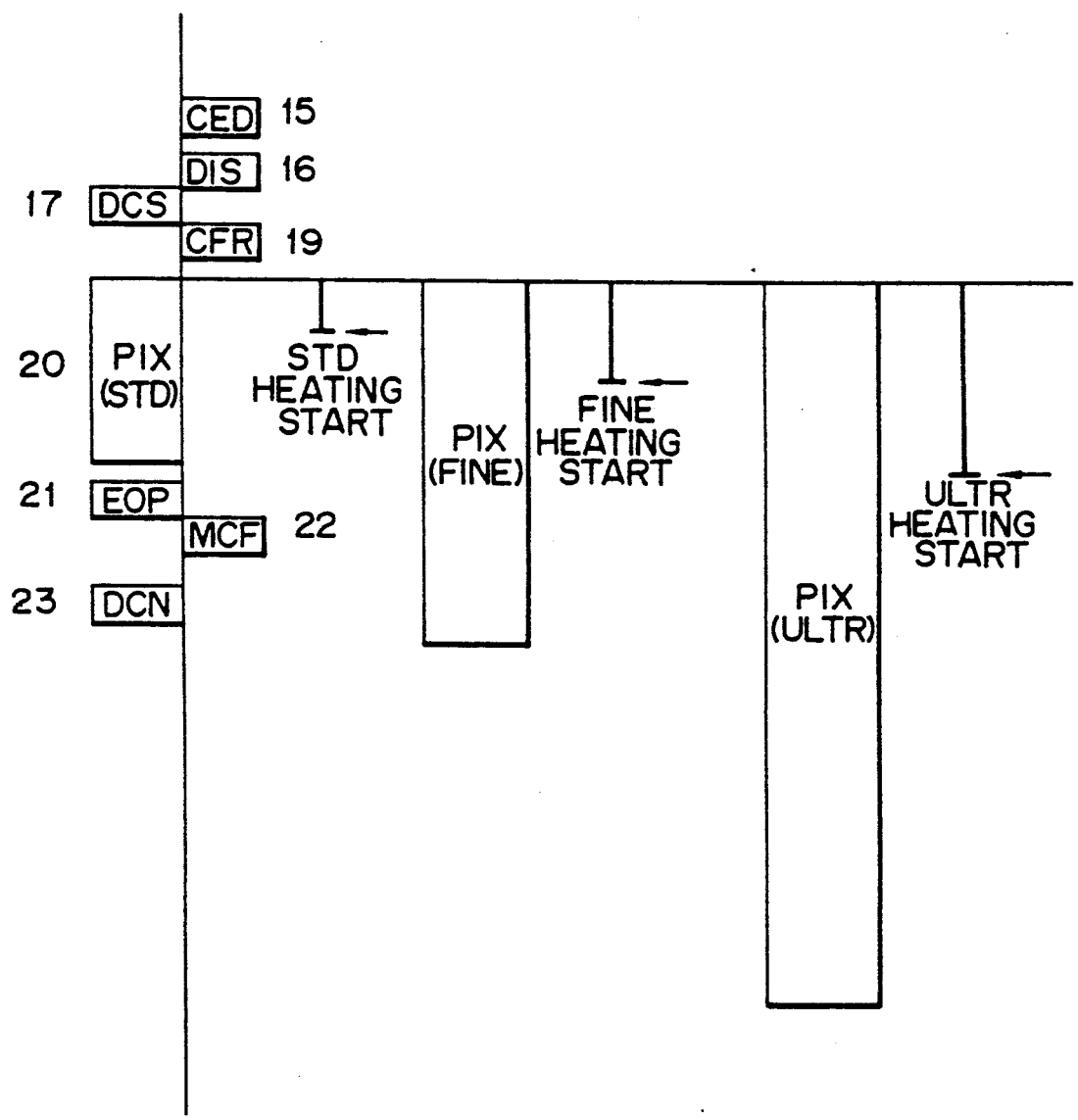
FIG. 5 is a timing chart of heating for a different image transmission mode.

FIG. 5 shows the timing of heating of the heating member 8 in case of transmitted images of different modes with different scanning line densities. If the heating of the heating member is started x seconds after the start of reception of the PIX signal 20 in the standard mode STD, the heating in the FINE mode of higher scanning line density can be started after 2 x seconds, because the communication time is doubled in said mode. Also in the ULTR mode with still higher scanning line density, the heating can be started after 4 x seconds, since the communication in this case is quadrapled.

Another Embodiment

The heating member employed in the foregoing embodiment requires several seconds to reach the fixing temperature after the start of heating, but the heating member of improved performance requiring several ten to several milliseconds for heating allows control in the unit of each line, thereby further reducing the electric power consumption.

In such control for each line, it is possible to judge the content of image information and to dispense with the heating in case a line consists of all white pixels.

In the substituted reception when the recording sheet or toner is absent, the image data are simply stored in the memory. In such state it is possible not to start heating even after the start of reception of the image signal, thereby preventing waste of electric power consumption.

Figure 6A:
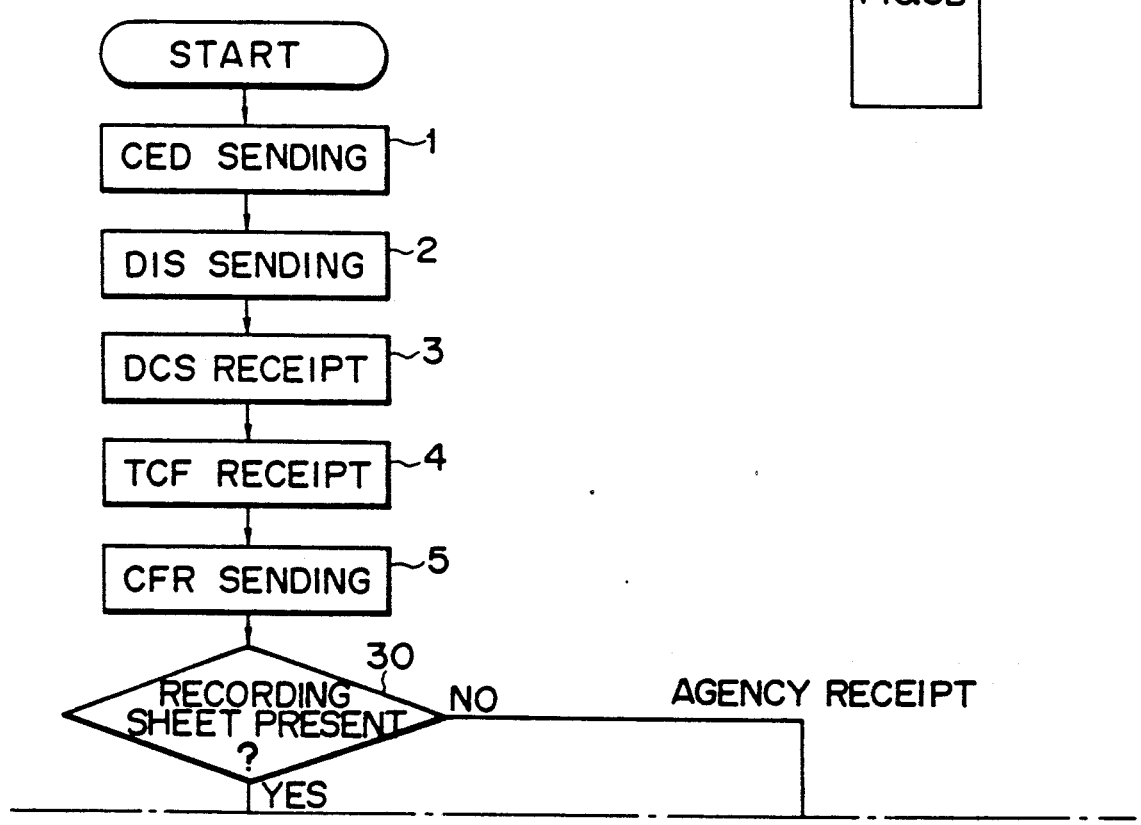
FIG. 6, consisting of FIGS. 6A and 6B, and FIG. 7, consisting of FIGS. 7A and 7B, are flow charts of control sequence of the heat generating member in the substituted reception mode.

FIG. 6 is a flow chart for conducting such control, wherein steps 1 to 14 are same as those in FIG. 4 and will not therefore be explained. In this case, between the steps 5 and 6 shown in FIG. 4, there is conducted discrimination on the presence or absence of recording sheet, based on the output of the sensor 20 (step 30). In case of absence of recording sheet, the sequence proceeds to a step 31 for waiting until the reception of the image signal PIX, and, when the reception is started, the received image signal is stored in the memory 6 (step 32). When the reception of the image signal PIX is completed (step 33), there is awaited the reception of the end-of-procedure signal EOP (step 34), and the message confirmation signal MCF is sent to the other apparatus (step 35). Then in response to the reception of the disconnect signal DCN (step 36), the procedure is terminated.

It is also possible, if the recording sheet or the toner becomes absent in the course of a recording operation, to turn off the power supply to the heating member and to start substituted reception.

Figure 7B:
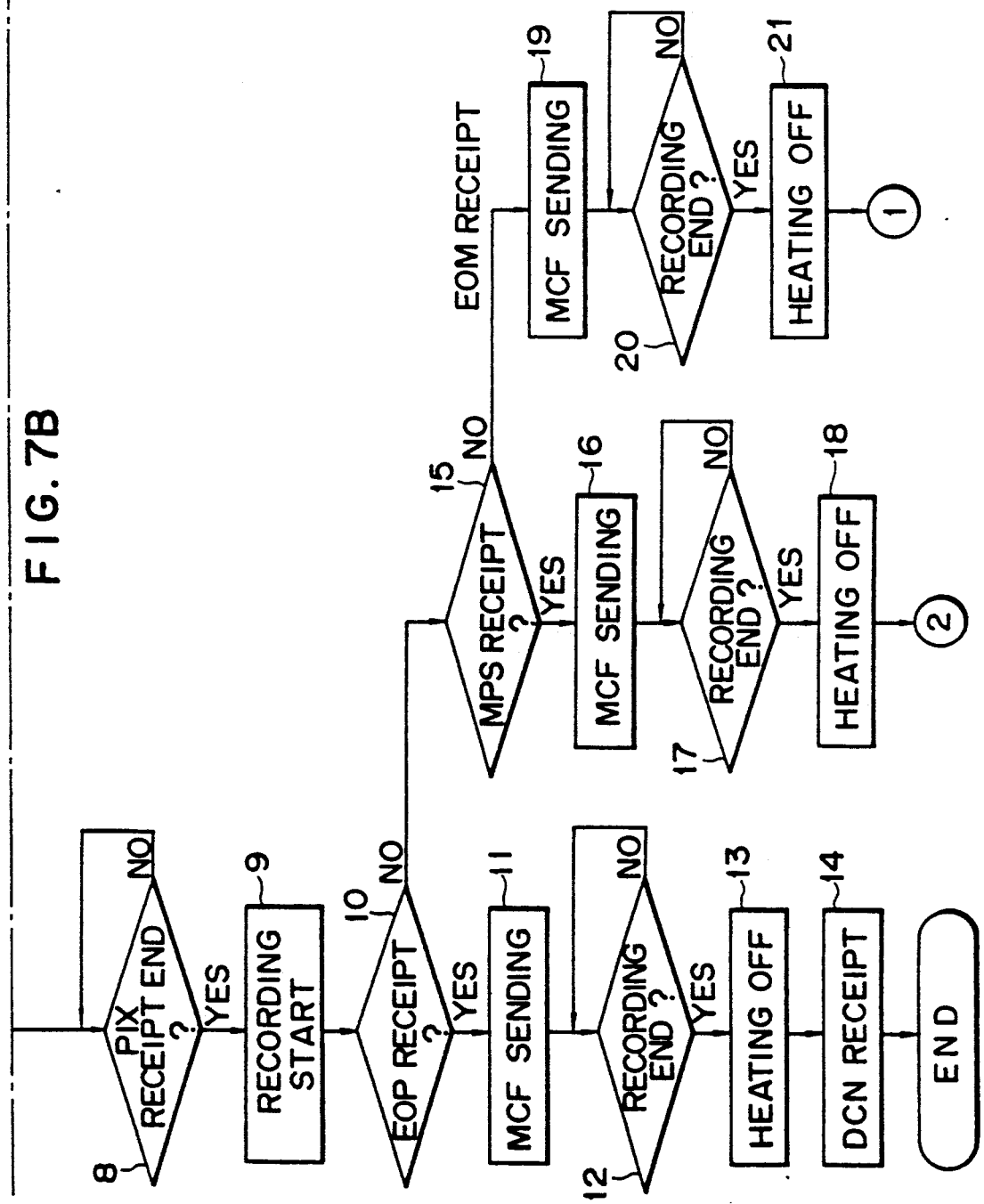

FIG. 7 is a flow chart for conducting such control, wherein same steps as those in FIGS. 4 and 6 are represented by same numbers. In the present embodiment, in the multi-page reception, the power supply to the heating member 8 is turned off after the recording of each page, and the sequence returns to the step 30 for discriminating the presence of the recording sheet. If the recording sheet is absent, there is adopted the substituted reception mode starting from the step 31, and the received image signal is stored in the memory 6 (steps 32, 33) as in FIG. 6. Then, if the end-of-procedure signal EOP is received in a step 34, steps 35 and 36 are executed in the same manner as in FIG. 6. On the other hand, if the EOP signal is not received in the step 34, the sequence proceeds to a step 37 for discriminating the reception of the multi-page signal MPS.

If received, the MCF signal is transmitted (step 38) and the sequence returns to the step 30. If the MPS signal is not received, the MCF signal is transmitted (step 39) and the sequence returns to the step 2. In this manner, the presence of the recording sheet is discriminated after the storage of image signal of each page even after the substituted reception mode is selected, and the recording operation is re-started when the recording sheets are replenished.

It is also possible, after the substituted reception mode is once selected, to store all the image signal of this communication into the memory.

In the present embodiment the substituted reception mode is selected in response to the absence of the recording sheet, but it is also possible to effect the change of mode in response to the absence of other consumable materials such as toner.

Also, in the foregoing embodiments, the power supply to the heating member is started in response to the reception of the image signal PIX, but it may also be started in response to the reception of protocol signals preceding the image signal PIX.

In the foregoing embodiments, the recording sheet is heated by the heating member across a heat-resistance film, but the present invention is not limited to such embodiment and is applicable to apparatus equipped with various fixing means for image fixation by immediate heating.

What is claimed is:

1. A facsimile apparatus comprising:
   communication means for receiving through a communication line transmitted image data from a remote communication apparatus;
   recording means for forming a visible image on a recording material according to the image data which is transmitted from the remote communication apparatus and received by said communication means;
   fixing means for heat-fixing the visible image formed on the recording material by said recording means, said fixing means comprising a heating member, a heat resistant sheet travelling with the recording material and pressing means opposed to and in pressure contact with said heating member; and
   control means for controlling said fixing means to start heating and stop said heating after completion of image data recording of at least one sheet.

2. An apparatus according to claim 1, wherein said control means is adapted to start the heating of said fixing means in accordance with a predetermined signal relating to communication, and to terminate the heating of said fixing means in accordance with completion of recording of a page of image data.

3. An apparatus according to claim 1, wherein said control means is adapted, in case of multi-page communication, to start the heating of said fixing means in accordance with a predetermined signal relating to communication, and to terminate the heating of said fixing means in accordance with the completion of recording of a series of pages.

4. An apparatus according to claim 1, wherein said heating member generates heat by electrical power supply, and wherein said pressing means, is opposed to and maintained in pressure contact with said heating member, for maintaining said recording material in close contact with said heating member across said heat resistant sheet.

5. An apparatus according to claim 4, wherein said control means is adapted to turn on and off the power supply to said heating member.

6. A facsimile apparatus having a plurality of communication modes comprising:
communication means for receiving through a communication line transmitted image data from a remote communication apparatus;
recording means for forming a visible image on a recording material according to the image data which is transmitted from the remote communication apparatus and received by said communication means;
fixing means for heat-fixing the visible image formed on the recording material by said recording means; and
control means for controlling heating by said fixing means according to the communication mode,
wherein said control means is adapted to vary a time of start of power supply to said fixing means according to said communication mode.

7. An apparatus according to claim 6, wherein said fixing means comprises a heating member generating heat by electric power supply, a heat-resistant sheet, and pressurizing means, opposed to and maintained in pressure contact with said heat member, for maintaining said recording material in close contact with said heating member across said heat resistant sheet.

8. An apparatus according to claim 6, having a first communication mode with a first scanning line density and a second communication mode with a second scanning line density higher than said first scanning line density, wherein said control means is adapted to delay the start of power supply to said fixing means in said first communication mode, than in said second communication mode.

9. A facsimile apparatus comprising:
communication means for receiving through a communication line transmitted image data from a remote communication apparatus;
recording means for forming a visible image on a recording material according to the image data which is transmitted from the remote communication apparatus and received by said communication means;
fixing means for heat-fixing the visible image formed on the recording material by said recording means; and
control means for controlling the heating of said fixing means in accordance with reception, of said image data,
wherein said control means is adapted to prohibit said control of heating of said fixing means in a substituted reception mode.

10. An apparatus according to claim 9, wherein said fixing means comprises a heating member generating heat by electric power supply, a heat-resistant sheet, and pressurizing means, opposed to and maintained in pressure contact with said heating member, for maintaining said recording material in close contact with said heating member across said heat resistant sheet.

11. An apparatus according to claim 10, wherein said control means is adapted to effect on-off control of power supply to said heating member.

12. A facsimile apparatus comprising:
communication means for receiving through a communication line transmitted image data from a remote communication apparatus;
recording means for forming a visible image on a recording material according to the image data which is transmitted from the remote communication apparatus and received by said communication means;
fixing means for heat-fixing the visible image formed on the recording material by said recording means; and
control means for controlling the heating of said fixing means in accordance with reception of said image data,
wherein said control means is adapted to interrupt the control of heating of said fixing means when substituted reception mode is selected during of an image data reception operation.

13. An apparatus according to claim 12, wherein said fixing means comprises a heating member generating heat by electric power supply, and said control means is adapted to turn on and off the power supply to said heating member at every predetermined communication unit and to turn off the power supply to said heating member when said substituted reception mode is selected.

14. An apparatus according to claim 12 or 13, further comprising detection means for detecting absence of the recording material, wherein the substituted reception mode is selected in response to a detection signal from said detection means.

15. An apparatus according to one of claims 12 or 13, wherein said fixing means comprises a heating member generating heat by electric power supply, a heat-resistant sheet, and pressurizing means, opposed to and maintained in pressure contact with said heating member, for maintaining said recording material in close contact with said heating member across said heat resistant sheet.

* * * * *

UNITED STATES PATENT AND TRADEMARK OFFICE
CERTIFICATE OF CORRECTION

PATENT NO. :   5,068,675

DATED      :   November 26, 1991

INVENTOR(S):   Masanori Momose

It is certified that error appears in the above-identified patent and that said Letters Patent is hereby corrected as shown below:

Title page,
<u>At [56] References Cited</u>:

FOREIGN PATENT DOCUMENTS

"22078064 2/1988 Japan." should read
--207064 9/1987 Japan--.

COLUMN 3:

TAB. 1, "successing" should read --succeeding--.

Line 67, "on" should read --one--.

COLUMN 5:

Line 23, "quadra-" should read -- quadru--.

Line 29, "ten" should read --tens--.

UNITED STATES PATENT AND TRADEMARK OFFICE
CERTIFICATE OF CORRECTION

PATENT NO. : 5,068,675
DATED : November 26, 1991
INVENTOR(S) : Masanori Momose It is certified that error appears in the above-identified patent and that said Letters Patent is hereby corrected as shown below:

COLUMN 6:

Line 21, "signal" should read --signals--.

Line 34, "heat-resistance" should read --heat-resistant--.

COLUMN 7:

Line 35, "heat member" should read --heating member--.

COLUMN 8:

Line 34, "of" should be deleted.

Signed and Sealed this

Twenty-second Day of June, 1993

Attest:

MICHAEL K. KIRK

*Attesting Officer*       *Acting Commissioner of Patents and Trademarks*